Patented Aug. 29, 1944

2,356,792

UNITED STATES PATENT OFFICE 2,356,792

LIQUID COMPOSITION FOR POLISHING AND THE LIKE

Byron J. Oakes and Dean K. Murray, St. Paul, Minn., assignors to Minnesota Mining & Manufacturing Company, St. Paul, Minn., a corporation of Delaware No Drawing. Application November 5, 1938, Serial No. 239,178

2 Claims. (Cl. 106—11)

This invention relates to a composition of matter, including especially compositions in the nature of liquid polishes. It also has special relation to suspensions, for example, where small abrasive particles are suspended in a fluid.

An illustration of the important uses and applications of this invention is found in polishing surface coats of enamel, varnish or the like, for example, surface coats of baked enamel (e. g. of the alkyd resin or urea resin type), lacquers such as nitrocellulose lacquers, or other materials which present similar problems in eliminating scratches from the surfaces thereof. These types of coating materials are used in large volumes in the finishing of automobiles or auto bodies, but are also used to a substantial extent in the refrigerator and other industries. A rough polishing job may first be done with a sheet abrasive material or the like, but a fluid polish, e. g. of the type herein described, is desired to remove "sand" scratches and to give the finish the desired luster.

It is common to use these polishes by applying them to the surfaces to be polished, for example with a brush and then to polish them down with a power driven machine comprising a rotating element having a sheepskin bonnet or pad which comes into contact with the surfaces to be polished. A common incident of this operation is a dense dust, which polutes the air, the dust being due to the solids of the polish which, after drying, are thrown out into the air.

Heretofore liquid polishes have been suggested for giving a luster to coated surfaces but such polishes have commonly contained silica, which is variously referred to in the literature as "silica," diatomaceous earth, kieselguhr, tripoli, and the like. Regardless of the name employed in designating such abradant particles, where materials high in silica are used in liquid polishes, which are applied or worked with a high speed machine, a serious health hazard is caused. Workmen breathe in silica dust which is thrown out into the air by the machine polishers and this has a tendency to cause silicosis, which is a serious affliction.

Suggestions have heretofore been made of making certain types of polishes containing non-silica bearing abrasive particles, but these ideas have usually been directed to use of such abrasive materials along with some form of silica. However where the silica has been retained, even though some other abrasive is present, the health hazard caused by silica dust is, of course, not avoided. On the other hand, so far as we are aware no one has ever taught how to prepare a polish which would do a good polishing job on finishes or coatings, such as those of nitrocellulose lacquer, baked enamels, etc., and also would be otherwise commercially satisfactory, which did not contain silica in some form. Suggestions have been made of the use of abrasive particles of aluminum oxide and silicon carbide, for example, in admixture with liquids, but the product obtained according to such suggestion was unsatisfactory either because the abrasive particles would not stay in suspension or because the product, as made, would leave scratches on the surfaces intended to be polished, or because of both these reasons. Certain of these polishes also had various other defects including difficulty in use, "burning" of the finished surface, etc.

It is an object of this invention to produce a new and advantageous composition. A further object is to produce a liquid or cream-like polish which is free or relatively free of silica. Another object is to produce a suspension of non-silica abrasive particles in liquids and to make such suspension stable. A further object is to produce a fluid polish containing suspended abrasive particles having break-down characteristics so that, during polishing, they will not leave scratches on surfaces to be polished but, on the other hand, will leave a finish which is free of "sand" scratches and has a high luster. Still another object is to treat surfaces of abrasive particles so as to render the polishes or suspension which are made therefrom more stable. These and other objects and advantages will appear from the application taken as a whole.

The following examples will illustrate specific compositions made in accordance with our invention.

Example 1

| | Parts by weight |
|---|---|
| Water | 10 |
| "Orvus" (a fatty alcohol sulphate) | 1 |
| Hydrocarbon liquid composed largely of kerosene | 28 |
| Pine oil | 1 |
| Feldspar abrasive particles | 60 |

The foregoing composition may be prepared or compounded by heating the hydrocarbon liquid, the water and the "Orvus" to a temperature, for example, of the order of 135° to 155° F. while mixing the ingredients. The mixing is usually preferably accomplished with a power driven high speed mixer. When the emulsion is formed, the abrasive particles may then be added and thoroughly mixed to form a uniform suspension. The pine oil or equivalent may be added with the hydrocarbon liquid and water, or at a later time, as desired. The resulting composition comprises an oil-in-water emulsion having abrasive feldspar particles suspended therein. Therefore it will be evident that the emulsion is capable of additional thinning with water, where desired, since the water is in the continuous phase.

While the particle size of the abrasive may be varied, depending upon circumstances and/or the type of polish desired, an illustrative polish is one made with potash feldspar or barium feldspar having a particle size such that about 95% thereof will pass a 200 mesh screen and so that all of the abrasive particles will pass a 115 mesh screen.

The Orvus or equivalent material serves to stabilize the emulsion of water and hydrocarbon oil, e. g. water and hydrocarbon liquid comprising kerosene, and aids in stabilizing the suspension made therewith. Without intending to be limited by theory of action, it is possible that the surface forces at the interfaces between the oil particles and the water may aid in preventing the settling of the abrasive particles.

The pine oil or equivalent serves an important function. For example, where a polish composed of the above ingredients is employed in polishing surface coatings such as baked enamels of the alkyd resin type, cellulose acetate lacquers, etc., the pine oil appears to act as a softener for such coating composition with the result that the polishing can be carried out without developing so much heat; also, an improved luster results where such an ingredient is employed in fluid polishes used in giving a smooth or lustrous surface to such coating or finishing composition. In place of pine oil, small amounts of other lacquer or enamel solvents may be used, one illustration being "Solvenol" which is a commercial product derived from wood and is of a nature generally similar to turpentine.

In addition to aiding in keeping the abrasive particles in suspension, the hydrocarbon liquid may be used in varying amounts, and with varying characteristics, depending upon the speed of cut desired, the latter being controlled largely by the volatility of the lubricant and the dissolving characteristics of the pine oil or other lacquer or enamel solvents.

While a hydrocarbon liquid composed largely of kerosene, or of hydrocarbons within the kerosene boiling range, has been used in the above example by way of illustration, this material may be replaced by other emulsifiable hydrocarbons or oil mixtures which often, though not always necessarily, are chosen so that they have vaporization characteristics more or less within the approximate range of kerosene, oleum or the like. The choice of this oil will depend, among other things, on the speed of cut desired. In general by replacing an emulsifiable oil or hydrocarbon liquid of the character hereinabove illustrated by a more rapidly evaporating material, the speed of cutting is slowed up; whereas by replacing the above illustrated hydrocarbon liquid by more slowly evaporating oil, the speed of cutting is increased. Where the function of the polish is primarily to give a good finish to a coating surface which is relatively free from scratches, a more rapidly evaporating oil will generally be employed; and, where the polish must do a substantial amount of cutting in order to eliminate deep scratches such as sand scratches, a higher boiling or more slowly evaporating oil may be used.

In place of hydrocarbon oils or kerosenes, non-hydrocarbon oils which have suitable vaporization characteristics and can be emulsified in water may be used. Likewise other liquids having comparable characteristics and which will serve the functions of kerosene may be used.

The following is illustrative of a polish intended to provide a relatively rapid cutting action.

Example 2

| | Parts by weight |
|---|---|
| Water | 6 |
| "Dreft" (a sulfonated higher alcohol) | 0.6 |
| Lubricating oil | 17 |
| Pine oil | 0.65 |
| Ceramic coated abrasive particles | 38 |

We have prepared this composition satisfactorily by dissolving the "dreft" (a sodium salt of the half ester of sulfonic acid and a higher alcohol preferably having 12 or more carbon atoms per molecule) in the water, the latter being heated to a temperature of the order of 150° F. This mixture may be stirred rapidly, as with a lightning mixer, and then the lubricating oil, heated to a temperature of the order of 150° F., may be added while continuing the mixing until the emulsion is formed. Thereafter the abrasive particles may be added in increments while continuing the mixing until all of the abrasive particles are added and a uniform suspension and emulsion is made. The pine oil or equivalent may be added at any desired point and uniformly stirred into the mixture. For example it may be added along with the lubricating oil.

The lubricating oil may consist of a refined kerosene such as the material sold under the trade name, "Eocene," and/or of oleum and/or V. M. P. naphtha.

Other emulsifiers besides "Dreft" may be used, including the emulsifier mentioned hereinabove in Example 1. Also other emulsifiers may be used, particularly those of the sulfonated higher alcohol type, the fatty alcohol sulphate type, etc. Ordinary soaps are inferior in most cases to the types of emulsifiers specifically illustrated hereinabove.

While ceramic coated silicon carbide, aluminum oxide, marble dust, etc., may be employed as the abrasive, feldspars, especially potash feldspar, is preferred non-silica abrasive material. The size of the abrasive may, for example, be of the order of that specified in connection with Example 1, somewhat coarser or somewhat finer, as desired.

Where a slower rate of cutting is desired, that is less depth of cut that would be provided by a polish as illustrated in Example 2, a polish such as illustrated in the following example may be employed. This may be referred to as a cleanup polish, one used to tone up the polished surface and give it a high luster which is free or substantially free of swirl marks.

Example 3

| | Parts by weight |
|---|---|
| Water | 6 |
| Emulsifier such as "Orvus" | 0.6 |
| Hydrocarbon lubricating oils | 18 |
| Pine oil | 0.6 |
| Potash feldspar abrasive particles | 39 |

The ingredients of Example 3 may be compounded in substantially the manner described in connection with Example 2. The abrasive, which may be composed of materials such as alumino-silicates of alkaline earth metals or alkali metals, barium feldspars, etc., though preferably composed of the material specifically mentioned, may be of such fine granular size that all of it will pass a silk screen (bolting cloth) having 200 meshes per inch.

While, as illustrated above, abrasive material such as feldspar or other materials which have similar "break down properties," i. e. which have a similar crumbly nature, are preferred abrasives and give advantageous results in the polishing of lacquers and enamels such as are used on automobiles, refrigerators and the like, as well as other coatings, other non-silica abrasives may be used in place thereof, when subjected to suitable surface treatments. Illustrative of these materials are silicon carbide, aluminum oxide, calcium carbonates, synthetically prepared abrasive material, etc. However these materials do not possess all of the advantages of an abrasive such as potash feldspar; nor do they have the desired "break down" characteristics of materials such as potash feldspars.

By "breakdown" characteristics we have reference to the property of abrasive particles, when used in liquid polishes to crumble or break down during the polishing operation rather than to cause gouges or scratches in the surface to be finished.

It is customary to use these polishes by first applying the polish to the desired surface with a brush and by then polishing down the surface with a machine polisher comprising a rotating element having a sheep skin bonnet or pad, as above referred to. This operation commonly causes the solid portions of the polish to be eventually thrown out into the air. This dust is then unavoidably breathed in to some extent by the workmen. Thus it is highly important to have a polish which, in addition to other desired characteristics, is free or substantially free of silica.

With any of the abrasive materials mentioned above, and especially where materials of the nature of silicon carbide, aluminum oxide, or barium feldspar are employed, it is desirable to coat these particles of abrasive, before attempting to suspend them in a liquid or emulsion, for example with a ceramic or clay coating which may be applied in generally the manner described in the copending application of John A. Brown et al., filed October 30, 1937. That is, the mineral, ceramic or clay material may be applied to the abrasive grains as a slurry or slip and then set up on the surfaces thereof to form a porous, foraminous coating which, due to its capillarity or interstices, or other physical or chemical properties, aids in keeping abrasive particles in a state of uniform suspension in the fluid vehicle.

The following is an illustration of a specific method employed by us in treating finely divided abrasive particles so as to render them more permanently suspendable in polishes as herein illustrated. 100 pounds of finely divided silicon carbide abrasive particles were coated with a thin slip comprising 4 pounds of clay-like material and about 10 pounds of water, the ingredients being mixed and agitated in a rotary mixer to distribute the clay-like material approximately uniformly over the surfaces of the abrasive grains. Then the coated abrasive grains were fired at about 750° C. so as to set up the clay-like material on surfaces of the abrasive grains but not to vitrify the same. After this firing operation, the coated abrasive grains were cooled and screened to remove any clusters which formed.

The abrasive coated was of a size having a grit number of 360 (roughly 25–50 microns in size, with an average size of about 35 microns). The solid of the coating composition was composed of the residual clay-like material left after fusing aluminum out of bauxite. It is a waste product of the aluminum industry and contains roughly 28 percent of $Al_2O_3$ in addition to other components resulting from the non-aluminum constituents of bauxite.

An illustrative potash feldspar used in making liquid polishes according to this invention had the following range of particle sizes, as shown by an analysis made on Tyler Standard Screens, which follows:

| | |
|---|---:|
| Percent retained on 115 mesh screen | none |
| Percent retained on 150 mesh screen | 10 |
| Percent of balance retained on 200 mesh screen | 23 |
| Percent of balance retained on 240 mesh screen | 17 |
| Percent of balance retained on 325 mesh screen | 45 |
| Percent passing through 325 mesh screen | 6 |

With the use of an abrasive such as aluminum oxide or silicon carbide, the grit size may be extremely fine because of its resistance to "break down." In this case the clay or ceramic coating chosen is preferably a very fine or powdery material so as to obtain a proper coverage of the abrasive particles. It is therefore preferable to use ceramic or clay-like materials of the nature of various commercially prepared earthly clays such as the one sold under the trade name "Alorco Insulating Powder," or the like, though other fine ceramic or clay-like material may be used. The silicon carbide may be of such small size as to have a grit number of the order of 360 to 400, more or less.

By such a treatment or coating of abrasive particles, many materials not otherwise adapted for use in liquid polishes are thereby rendered useful for such purposes. The unfused clay, ceramic or mineral coating aids in keeping such particles in a state of suspension. It is necessary, from the viewpoint of commercial use, for a polish to remain as a substantially uniform suspension over extended periods of time if it is to be acceptable to the trade.

While such clay coatings, or their equivalent, are especially desired where abrasive particles of the nature of silicon carbide, aluminum oxide, and marble dust are employed, they may also be used where abrasive particles of the nature of feldspar such as potash feldspar are employed, although such coatings may be dispensed with in the case of abrasives such as potash feldspars.

These types of coatings and abrasive particles are also advantageous where, in place of preferred emulsifying agents such as those illustrated hereinabove, soaps are used as emulsifiers. The following is an illustration of an emulsion having soaps instead of sulfonated alcohols or the like as the emulsifying agent.

Example 4

| | Parts by weight |
|---|---:|
| "Red oil soap" | 22½ |
| Water | 112½ |
| Lubricating oil | 360 |
| Clay coated abrasive particles | 506 |

The compounding of these ingredients may be carried out in generally the manner described hereinabove in connection with the other examples given. The "red oil soap" is a commercial preparation comprising the sodium soap of oleic acid. This material and the water may be heated to a temperature of the order of 135° F. and, to this, the lubricating oil at approximately the same temperature may be added, agitation or a stirring being carried on all the while, for example by the use of a lightning mixer or other power driven mixer. After a uniformly mixed composition or emulsion is secured, the coated abrasive particles may then be added in the manner heretofore described. The lubricating oils mentioned in the last example, while they may be composed of or compromise a refined kerosene, may be varied in composition depending upon the nature of the polish desired or the speed of cut which is sought in the use of the polish. Increasing or decreasing the cutting speed of the polish by controlling the vaporization characteristics of the oil or lubricant will be understood from the discussion given hereinabove.

Although various materials have been suggested hereinabove, by way of example, for use as abrasive particles to be suspended in a liquid or in an emulsion, materials having "break down" characteristics or a crumbly nature such as potash feldspar and which are free or substantially free of silica are preferred.

In place of or in addition to the use of clays, crystalline material, or materials of ceramic nature coated on abrasive particles to aid in maintaining them in suspension in the vehicle, certain other materials may be employed, for example by disseminating the same in the vehicle. Illustrative of materials which may be used for this purpose are certain gums and resins, for example gums which swell up in water, a specific example being tragacanth, although it will be understood that other materials of this general nature may be substituted.

While the invention has been illustrated hereinabove by various specific examples and detailed illustrative description, our invention is not intended to be limited thereby but to comprehend all embodiments and variations within the scope of the appended claims.

What we claim is:

1. As a new composition of matter, a viscous liquid abrasive polish, adapted for use in polishing lacquered and enameled surfaces, comprising an oil-in-water emulsion having finely divided feldspar abrasive particles suspended therein, said oil-in-water emulsion comprising volatile mineral oil as the dispersed phase and water as the continuous phase, with said mineral oil present in proportion by weight at least approximately three times that of said water; a water-soluble emulsifying agent present in substantial but minor proportion to said water; and said abrasive particles being present in greater proportion by weight than the aggregate of the liquid constituents of said polish.

2. As a new composition of matter, a viscous liquid abrasive polish, adapted for use in polishing lacquered and enameled surfaces, comprising an oil-in-water emulsion having finely divided potash feldspar abrasive particles suspended therein, said oil-in-water emulsion comprising mineral oil having vaporization characteristics approximately the same as kerosene as the dispersed phase and water as the continuous phase, with said mineral oil present in proportion by weight at least approximately three times that of said water; a water-soluble emulsifying agent present in substantial but minor proportion to said water; and said abrasive particles being present in greater proportion by weight than the aggregate of the liquid constituents of said polish.

BYRON J. OAKES.
DEAN K. MURRAY.